(12) United States Patent
Wu et al.

(10) Patent No.: US 12,526,320 B2
(45) Date of Patent: Jan. 13, 2026

(54) NETWORK SECURITY DEFENSE METHOD, SYSTEM AND EFFECT EVALUATION METHOD, AND RELATED APPARATUS

(71) Applicants: China National Digital Switching System Engineering & Technological R&D Center, Zhengzhou (CN); Zhuhai Comleader Information Science & Technology Corp., Ltd., Zhuhai (CN)

(72) Inventors: Jiangxing Wu, Zhengzhou (CN); Lei He, Zhengzhou (CN); Quan Ren, Zhengzhou (CN); Jun Zhou, Zhengzhou (CN); Min Fu, Zhengzhou (CN); Weili Zhang, Zhengzhou (CN); Ruihao Ding, Zhengzhou (CN); Yiwei Guo, Zhuhai (CN); Jinsuo Zhou, Shanghai (CN)

(73) Assignees: China National Digital Switching System Engineering & Technological R&D Center, Zhengzhou (CN); Zhuhai Comleader Information Science & Technology Corp., Ltd., Zhuhai (CN)

( * ) Notice: Subject to any disclaimer, the term of this patent is extended or adjusted under 35 U.S.C. 154(b) by 294 days.

(21) Appl. No.: 18/008,946

(22) PCT Filed: Jun. 7, 2021

(86) PCT No.: PCT/CN2021/098594
§ 371 (c)(1),
(2) Date: Dec. 7, 2022

(87) PCT Pub. No.: WO2021/249333
PCT Pub. Date: Dec. 16, 2021

(65) Prior Publication Data
US 2023/0224333 A1    Jul. 13, 2023

(30) Foreign Application Priority Data

Jun. 9, 2020   (CN) .......................... 202010519108.7

(51) Int. Cl.
*H04L 9/40* (2022.01)
*H04L 1/22* (2006.01)

(52) U.S. Cl.
CPC ............. *H04L 63/20* (2013.01); *H04L 1/22* (2013.01)

(58) Field of Classification Search
CPC ......... H04L 63/20; H04L 41/28; H04L 69/24; H04L 1/22; G06F 11/16
See application file for complete search history.

(56) References Cited

U.S. PATENT DOCUMENTS 11,179,639 B1 * 11/2021 Aghdaie ................. A63F 13/75
2020/0099722 A1    3/2020 Wu

FOREIGN PATENT DOCUMENTS

| CN | 103560867 A | 2/2014 |
| CN | 106534063 A | 3/2017 |

(Continued)

OTHER PUBLICATIONS

Bin Li, et al., "Mimic Encryption System for Network Security" Digital Object Identifier 10.1109; IEEE Access 2018.2869174, vol. 6 (2018); 20 pages.

(Continued)

*Primary Examiner* — Esther B. Henderson
(74) *Attorney, Agent, or Firm* — Schwabe, Williamson & Wyatt, P.C.

(57) ABSTRACT

Provided are network security defense method and network security defense system. The method includes: processing data multiple times using a preset processing strategy, where the processing strategy includes a first strategy and a second strategy, the first strategy is used for eliminating an influence (Continued)

of generalized disturbance on the second strategy, the second strategy after being eliminated the influence is applied to the data for calculation, storage and communication of the data, the first strategy includes an encoding strategy, a decoding strategy and a memory elimination strategy, and the generalized disturbance includes random disturbance and/or non-random disturbance; triggering a feedback control strategy based on a decoding result of the multiple processing results; and adjusting the first strategy according to the feedback control strategy.

6 Claims, 4 Drawing Sheets

(56) References Cited

FOREIGN PATENT DOCUMENTS

| | | |
|---|---|---|
| CN | 107040545 A | 8/2017 |
| CN | 110177084 A | 8/2019 |
| CN | 112217778 A | 1/2021 |

OTHER PUBLICATIONS

Hailong, et al., "Dynamic Heterogeneous Redundancy based Router Architecture with Mimic Defenses" Journal of Cyber Security, vol. 2, No. 1, Jan. 2017; 14 pages, including English abstract.

Kunlun, et al. "Design and Implementation of Database Offline Voting and Synchronizing Scheme" Journal of Information Engineering University, vol. 19, No. 1, Feb. 2018; 4 pages, including English abstract.

Xingming, et al., "Markov game modeling of mimic defense and defense strategy determination" Journal on Communication, vol. 39, No. 10, Oct. 2018; 12 pages, including English abstract.

Zeyu, et al., "Load-aware dynamic scheduling mechanism based on security strategies" Journal of Computer Applications, 1001-9081 (2017); 7 pages, including English abstract. DOI: 10.11772/j.issn.1001-9081.2017.11.3304.

Zhaoqi, et al., "A Mimic Arbitration Optimization Method Based on Heterogeneous Degree of Executors" Computer Engineering, vol. 46, No. 5, May 2020; 7 pages, including English abstract.

International Search Report and Written Opinion for PCT/CN2021/098594 dated Aug. 24, 2021; 11 pages, including English translation.

\* cited by examiner

NETWORK SECURITY DEFENSE METHOD, SYSTEM AND EFFECT EVALUATION METHOD, AND RELATED APPARATUS

The present application is a national phase entry under 35 U.S.C. § 371 of International Application No. PCT/CN2021/098594, filed Jun. 7, 2021 which designates the United States of America, which claims priority to Chinese Patent Application No. 202010519108.7, titled "NETWORK SECURITY DEFENSE METHOD AND SYSTEM, EFFECT EVALUATION METHOD AND RELATED APPARATUS", filed on Jun. 9, 2020 with the China National Intellectual Property Administration (CNIPA), the entire disclosures of each of these applications are hereby incorporated by reference in their entireties and for all purposes.

FIELD

The present disclosure relates to the field of network security, and in particular to a network security defense method and system, an effect evaluation method and related apparatus.

BACKGROUND

The development of contemporary computing technology brings mankind into a brilliant information age. However, security defects of the conventional computing technology itself also make cyberspace full of risks and uncertain threats. In cyberspace, in addition to an intrinsic (meta) function, there are always associated or derived explicit side effects or implicit dark functions in a software or hardware structure (or strategy). These side effects or dark functions, if being triggered by some factor, will affect correct expression of the intrinsic function. The side effects and the dark functions are referred to as "endogenous security problem" in cyberspace.

SUMMARY

In the process of research, the applicant found that most security threats in cyberspace are formed by an interaction between an artificial attack (i.e., an external cause) and "an endogenous security problem" (i.e., an internal cause) which exists in a target object. It can be seen that the endogenous security problem is an internal contradiction. No matter theoretically, technically, or economically, it is impossible to completely ensure that there is no endogenous security problem in cyberspace. The basic idea of the conventional security defense method is to design software and/or hardware capable of dealing with security threats. However, the newly introduced software and/or hardware will still introduce a new side effect or dark function.

Therefore, the applicant concludes that it is required to jump out of a repair defense thinking pattern of "afterwards remedy" in the conventional security defense method, so that the security of an information system no longer depends too much on software design, hardware design, production, operation of elements, devices, components or individual forms, as well as independent controllability and security credibility of management, that is, to make the basic structure of the information system have an endogenous security mechanism (or an endogenous security function).

A network security defense method and system, an effect evaluation method and apparatus thereof are provided according to the present disclosure, in order to solve the endogenous security problem of cyberspace using an endogenous security mechanism.

In order to realize the above objectives, the following technical solutions are provided according to the present disclosure.

A network security defense method includes:
processing data multiple times using a preset processing strategy, where the processing strategy includes a first strategy and a second strategy, the first strategy is used for eliminating an influence of generalized disturbance on the second strategy, the second strategy after being eliminated the influence is applied to the data for calculation, storage and communication of the data, the first strategy includes an encoding strategy, a decoding strategy and a memory elimination strategy, and the generalized disturbance includes random disturbance and/or non-random disturbance;
triggering a feedback control strategy based on a decoding result of the multiple processing results; and
adjusting the first strategy according to the feedback control strategy.

In an embodiment, the method further includes:
adjusting the encoding strategy and/or the decoding strategy according to the feedback control strategy.

A network security defense system includes:
a redundant channel, a feedback control module, and a channel memory elimination module, where:
the redundant channel includes multiple meta channels, the multiple meta channels have a same function and are independent from each other, each of the multiple meta channels is in an environment of generalized disturbance, and the generalized disturbance includes random disturbance and/or non-random disturbance;
the channel memory elimination module is configured to eliminate an influence of the generalized disturbance on a second strategy according to a first strategy, the second strategy is used by the meta channels to realize the function, and the first strategy includes a memory elimination strategy;
any one of the meta channels is configured to apply the second strategy after being eliminated the influence to data for calculation, storage and communication of the data;
the feedback control module is configured to trigger a feedback control strategy based on a decoding result of results outputted by the multiple meta channels; and
the channel memory elimination module is further configured to adjust the first strategy according to the feedback control strategy.

A network security defense system includes:
a redundant channel, a structure encoding module, an error correction decoding module, a feedback control module and a memory elimination module, where:
the redundant channel includes multiple meta channels, the multiple meta channels have a same function and are independent from each other, each of the multiple meta channels is in an environment of generalized disturbance, and the generalized disturbance includes random disturbance and/or non-random disturbance;
the structure encoding module is configured to encode structures of the meta channels according to a structure encoding strategy, to construct the multiple meta channels having the function;
the memory elimination module is configured to eliminate an influence of the generalized disturbance on a second strategy according to a first strategy, where the second strategy is used by the meta channels to realize the function, and first strategy includes a memory elimination strategy;

any one of the meta channels is configured to apply the second strategy after being eliminated the influence to data;

the error correction decoding module is configured to perform error correction decoding on results outputted by the multiple meta channels according to an error correction decoding strategy, to obtain an output result of the system;

the feedback control module is configured to trigger a feedback control strategy based on the output result of the system; and the channel memory elimination module is further configured to adjust the first strategy according to the feedback control strategy.

In an embodiment, the memory elimination module is further configured to:

eliminate an influence of the generalized disturbance on the structure encoding module, and/or, eliminate an influence of the generalized disturbance on the error correction decoding module; and the feedback control module is further configured to:

provide the structure encoding strategy for the structure encoding module, and/or, provide the error correction decoding strategy for the error correction decoding module.

In an embodiment, the feedback control module and the memory elimination module are implemented by a dynamic heterogeneous redundancy mechanism.

A method for evaluating an effect of network security defense, where the method is applied to the network security defense system described above, and the method includes:

evaluating an output error probability of the meta channels, in a case that the meta channels are in an environment of the non-random disturbance.

In an embodiment, the evaluating an output error probability of the meta channels includes:

finding a set of $2^{nR}$ code words in a case that a quantity of the meta channels is greater than a preset first threshold and a code length of data transmitted by the meta channels is greater than a preset second threshold, where the output error probability of the meta channels is an arbitrarily small positive number under a preset decoding rule.

A network security defense device includes:

a memory, configured to store a program; and a processor, configured to execute the program to implement the network security defense method or the method for evaluating the effect of network security defense described above.

A computer readable storage medium storing a computer program, where the computer program, when being executed on a computer, implements the network security defense method or the method for evaluating the effect of network security defense described above.

In the technical solutions according to the present disclosure, an influence of generalized disturbance on a second strategy is eliminated according to a first strategy including an encoding strategy, a decoding strategy and a memory elimination strategy, and the second strategy is applied to data so as to realize calculation, storage and communication of the data. The generalized disturbance, serving as an external cause, is capable of activating a failure (serving as an internal cause) of the second strategy, thereby producing an error and invalidation. Therefore, the error and invalidation caused by the activated failure are corrected according to the first strategy. In addition, the first strategy is adjusted according to a feedback control strategy triggered by a decoding result of data processing, thus to form a closed loop of steps, and an endogenous security problem is solved without external software and hardware. In summary, with the technical solutions according to the present disclosure, the endogenous security problem is solved through an endogenous security mechanism.

BRIEF DESCRIPTION OF THE DRAWINGS

In order to more clearly describe the technical solutions in the embodiments of the present disclosure or in the conventional technology, drawings to be used in the description of the embodiments of the present disclosure or the conventional technology are briefly described hereinafter. It is apparent that the drawings described below merely show some embodiments of the present disclosure, and those ordinary skilled in the art may obtain other drawings according to the provided drawings without any creative effort.

DETAILED DESCRIPTION OF EMBODIMENTS

Figure 1:
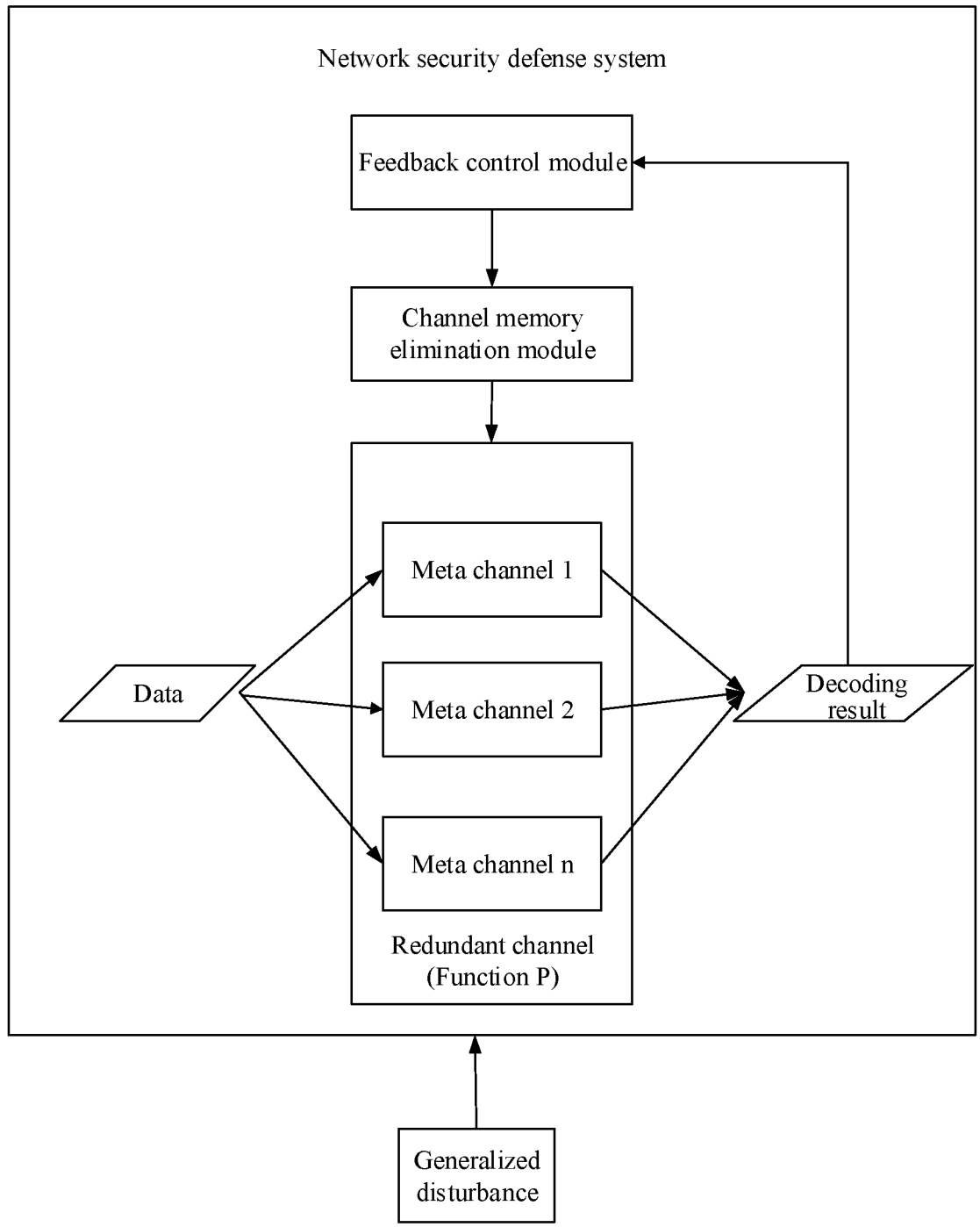
FIG. 1 is a schematic structural diagram of a network security defense system according to an embodiment of the present disclosure.

Construction principle of a dynamic heterogeneous redundancy memory elimination apparatus and a network security defense system according to embodiments of the present disclosure are described below.

1. Definition and Connotation of the Endogenous Security Problem Proposed by the Applicant The cyberspace of the information world has the same philosophical essence as the physical space of the real world, that is, "all things are inherent (endogenous) contradictions, and the contradictions are the root of all movements and vitality". The identity of contradictions is the premise of the existence and development of things, and is a condition for development. The struggle nature of the contradictions promotes growth and decline of the contradictions, which causes unbalanced development of the contradictions and creates conditions for transformation of the opposite and qualitative changes of things. Taking information technology as an example, with big data technology, an unknown law or feature may be found based on a strategy and a data sample. However, intentional contamination of the data sample and malicious triggering of a defect of the strategy may lead people astray. Blockchain technology opens up a new era of centerless accounting. However, the 51% consensus mechanism cannot avoid problems of loophole backdoor in COTS-level software and hardware products with a market share of more than 51%. With the development of the contemporary computing technology, mankind enters a brilliant information age. However, due to the security defect of the existing computing technology, the cyberspace is full of risks and uncertain threats. It can be seen that the endogenous security problem and the endogenous security service are different forms of a same system structure or strategy under different application targets and different usage scenarios, which meets the unity of opposites of contradictions and has ubiquity. The cyberspace is no exception. In addition to an intrinsic (meta) function, there are always associated or derived explicit side effects or implicit dark functions in a software or hardware structure (or strategy). These side effects or dark functions, if being triggered by some factor, will affect correct expression of the intrinsic function. The side effects and the dark functions are referred to as "endogenous security problem" in cyberspace.

The endogenous security problem may be further abstracted into two kinds of problems. One kind of problem is a narrow-sense endogenous security problem, which means that in addition to a designed intrinsic or meta function, a software or hardware entity always has an undesired function including a side effect, fragility, a natural invalidation and other factors expressed in an explicit or implicit way. The other kind of problem is a generalized endogenous security problem, which specifically means that, beyond the narrow-sense endogenous security problem, the software or hardware entity further has a function designed deliberately to be invisible to the user, or all software or hardware hidden functions that are not explicitly declared or disclosed to the user, such as deliberately designed "dark functions" including a front door, a back door and a trap door.

2. Characteristics of the Endogenous Security Problem Summarized by the Applicant It can be summarized characteristics of the "endogenous safety problem" from the definition and connotation of the endogenous safety problem.

(1) Inevitability of Existence

Loopholes and backdoors are always discovered from time to time, which never stops. According to a statistical law, there is a proportional relationship between the number of loopholes and the number of codes. The number of loopholes increases with the increase of system complexity and the increase of the number of codes. In addition, due to the development of global economy and the specialization and refinement of industrial division of labor, integrated innovation or manufacturing become a common production organization mode. The supply chains of various products such as a design chain, a tool chain, a production chain, a supporting chain and a service chain are getting longer and longer, involving wider scope and more steps, which provides many chances for the embedding and implantation of backdoors. The software and hardware code loopholes (trap doors) introduced by the above non-subjective factors or the backdoors artificially embedded into the information system are inevitable and difficult to avoid fundamentally, whether it is explained from the perspectives of endogeneity of contradictions, stage of technological development or interest game.

(2) Contingency in Presentation

Throughout the history of the discovery of loopholes, though loopholes are found from time to time, it is accidental with respect to when each loophole was discovered and how the loophole was discovered. That is, discovery of the loophole is an irregular phenomenon. From the epistemological point of view that "things can always be recognized", the existence and discovery of loopholes are inevitable events. However, it is accidental with respect to when, on which system and how the loophole represents, due to technical stage or era limitation of understanding of loopholes as well as the theoretical method and technical capability of checking the completeness of complex codes.

(3) Temporal and Spatial Characteristics of Cognition

Loopholes exist objectively, and the discovery of the loopholes has temporal and spatial attributes. It needs to accumulate recognitions to a certain degree by practice, to make the loophole appear. A system that is considered safe today may not be safe tomorrow. A system that "I" consider safe may not be safe in "his" eyes. A system that is safe in an environment A may not be safe in an environment B. That is the space-time difference of loophole due to cognition.

(4) Uncertainty of Threat

In economics, an American Frank Knight distinguishes the risk from uncertainty, that is, for a risk, people can know an uncertainty of the risk's probability distribution, and people may speculate the possibility of the future according to the past; while for uncertainty, people cannot predict a future event that has not happened. It is not difficult to see that "endogenous security problem" may result in two kinds of security threats. One kind of security threat significantly affects the reliability, credibility and availability of an intrinsic function or a meta-function of a target object. The other kind of security threat illegally obtains or infringes private information and data resources of other people. Due to the nature of "endogenous security problem", occurrence of the above two kinds of security threats is unpredictable and belongs to unknown threats in the range of uncertainty.

In a more general sense, due to stage of technology development and cognitive level of human, vulnerability or loophole of a software and hardware design cannot be completely avoided, exhausted or thoroughly investigated. In addition, in the era of globalization, open industrial ecological environment, open source collaborative technology model and industrial chain of "you have me, I have you" cause that a backdoor problem of software and hardware cannot be completely eliminated. Therefore, so far, for defensing an uncertain threat based on the endogenous security problem, in addition to trying to block an impact of disturbance from an attacked surface with an additional security technology, there is almost no security defense method or means with measurable design and verifiable measurement.

3. The Applicant Proposes a Solution Completely Different from the Conventional Network Security Defense Ideas Based on the Definition, Connotation and Characteristics of the Endogenous Security Problem Based on the cognition that "most of security threats in cyberspace are formed by an interaction of an artificial attack (i.e., an external cause) and the "endogenous security problem" (i.e., an internal cause) existing in the target object", an intuitive inference is that in order to completely eliminate the security threat in the cyberspace, the endogenous security problem is required to be completely eliminated, since the external cause can only work through the internal cause. However, theory and practice tell us that the endogenous security problem is inherently contradictory and cannot be "completely eliminated". First, under the general trend of globalization, open and collaborative innovation chain and industrial chain are becoming basic modes of technology development and modern production activities of human. It is almost impossible to achieve complete autonomous controllability, security and credibility at the supply chain level with the power of a single country. Second, there is no effective solution in theory and technology to the loophole caused by software and hardware design defect. Trying to fundamentally eliminate such problem violates the objective law of the stage of human cognition and scientific and technological development. This means that no matter theoretically, technically or economically, it is impossible to completely ensure that the environment constituted by cyberspace is free of endogenous security problem, that is, "non-toxic and sterile" is an almost impossible vision to achieve.

Based on the above analysis, a natural inference is how to change the problem scenario and solution idea, to realize "building on the beach" with security under the condition of "toxic and bacterial" cyberspace, so as to alleviate the "known unknown" risk and the "unknown unknown" threat challenge. Therefore, it is required to jump out of the repair defense thinking mode of "better late than never" in the conventional architecture, so that the security of information equipment no longer depends too much on software design, hardware design, production, operation of elements, devices, components or individual forms, as well as a degree of independent controllability and a level security credibility in management, that is, to make the basic structure of the information system have an endogenous security function or an endogenous security mechanism. This function or mechanism may contain the current situation of "toxic and bacterial" of software and hardware components to a certain extent or under a constraint, so that the intrinsic function has good stable robustness and quality stability against a random fault or a network attack.

In addition, the applicant also gets enlightenment from biological immunology.

Biological knowledge tells us that the innate non-specific immunity obtained by human through genetic characteristics can make a "non-specific elimination" response to most of invading pathogenic microorganisms, which is a kind of "surface" defense. Scientific research shows that although pathogenic microorganisms in nature are always mutating, the non-specific immunity simply depends on biological genetic information, and thus the body has a function of non-specific selective elimination of various invading pathogenic microorganisms that mutate in the real world. Therefore, the research results of biological immunology, such as an activation condition and manner of the specific immune mechanism, an update manner of genetic information in the whole life cycle of organisms, and an impact of a memory effect of the specific immunity (which is a kind of "point" defense) on the genetic information of the non-specific immunity, have enlightening significance on network security defense that whether a fusion defense capability similar to an immune mechanism of vertebrates can be designed in a software and hardware apparatus or system, so as to "produce an elimination function with no specific selection for an unknown attack based on an endogenous security problem of a target object", and timely trigger a point defense function similar to the specific immune mechanism. Therefore, the applicant believes that it is a feasible idea for the network architecture itself to resist a backdoor attack of unknown loophole (equivalent to that the immune system eliminates harm of an unknown pathogen).

In summary, the applicant summarizes the definition, connotation and characteristics of the endogenous security from a philosophical perspective, and further designs, based on the characteristics and biological immunology, a dynamic heterogeneous redundancy memory elimination apparatus and a network security defense system which have an endogenous security mechanism to solve the endogenous security problem in the cyberspace. Further, an evaluation method for the network security defense system is further provided according to the present disclosure, so as to innovatively propose a probability-based evaluation method under non-random disturbance.

Technical solutions of the embodiments of the present disclosure are clearly and completely described below in conjunction with drawings of the embodiments of the present disclosure. Apparently, the embodiments described below are only part of embodiments of the present disclosure, rather than all the embodiments. Any other embodiments obtained by those ordinary skilled in the art based on the embodiments of the present disclosure without any creative effort fall within the protection scope of the present disclosure.

FIG. 1 shows a network security defense system according to an embodiment of the present disclosure. The system includes a redundant channel, a feedback control module and a channel memory elimination module.

The redundant channel includes multiple meta channels. The multiple meta channels are independent from each other. Each of the multiple meta channels is in an environment of generalized disturbance. The generalized disturbance includes random disturbance and/or non-random disturbance.

The multiple meta channels have a same function which is represented by function P in FIG. 1. The function P includes calculation, storage and communication of data. Specifically, the function P may include but is not limited to: data transmission, domain name service, routing and switching, web service, file storage, and firewall. For implementations of the above functions, reference may be made to the conventional technology, which will not be repeated herein.

The generalized disturbance interferes with data in the meta channels, resulting in a data error. Therefore, in this embodiment, the channel memory elimination module is used to block the interference of the generalized disturbance to the data in the meta channels.

The channel memory elimination module is configured to eliminate an influence of the generalized disturbance on a second strategy according to a first strategy. The second strategy is a strategy used by the meta channels to realize the function P. The first strategy includes a memory elimination strategy.

In this embodiment, "eliminating the influence of the generalized disturbance on the second strategy using the memory elimination strategy" is creatively referred to as "channel memory elimination", that is, the channel memory elimination module is used for eliminating the memory of the meta channels. The eliminating memory substantially means to eliminate the influence of the generalized disturbance, that is, to eliminate the memory of the influence of the generalized disturbance.

Specifically, the memory elimination strategy includes but is not limited to eliminating the memory of the meta channels by reconstructing, reorganizing, redefining, dynamic scheduling and cleaning the meta channels. Furthermore, the reconstructing, reorganizing, redefining, dynamic scheduling and cleaning of the meta channels are based on a feedback control strategy. The functions of reconfiguring, reorganizing, redefining, dynamic scheduling and cleaning may be abstracted into functional modules or subsystems. For structures of the functional modules or the subsystems, reference may be made to the component pool in a scheduling module in mimicry defense architecture in the conventional technology, which will not be repeated herein.

Any one of the meta channels is configured to apply the second strategy after being eliminated the influence to data, so as to process the data.

The feedback control module is configured to acquire a decoding result of results outputted by the multiple meta channels, trigger a feedback control strategy based on the decoding result, and transmit the feedback control strategy to the channel memory elimination module.

An implementation of triggering the feedback control strategy based on the decoding result may be that: determining the feedback control strategy based on a preset correspondence between decoding results and strategies, or generating the feedback control strategy based on a preset strategy generation algorithm. Alternatively, for the implementation, reference may be made to the conventional technology, which will not be described herein.

The channel memory elimination module is further configured to adjust the first strategy according to the feedback control strategy. The adjusted first strategy is used for eliminating the influence of the generalized disturbance on the second strategy.

It can be understood that the eliminating memory of the channels using the memory elimination strategy, the meta channels processing data using the second strategy, triggering of the feedback control strategy and adjusting of the memory elimination strategy form a closed loop, which is described in detail below.

It may be set a channel memory elimination cycle as for example, 15 minutes. Within any one of channel memory elimination cycle, the channel memory elimination module eliminates the influence of the generalized disturbance on the second strategy by using a memory elimination strategy which is adjusted in a previous cycle, and any one of the meta channels applies the second strategy after being eliminated the influence to the data. The feedback control module triggers the feedback control strategy based on the decoding result of results outputted by the multiple meta channels. The channel memory elimination module adjusts the memory elimination strategy based on the feedback control strategy, to obtain the first strategy. The first strategy is used for eliminating the memory of the meta channels in a next cycle.

Further, in a case that the number of the meta channels is sufficient, the memory elimination of the meta channels and data processing may be performed in parallel. That is, after a meta channel whose memory is required to be eliminated in this cycle is offline, the memory of this meta channel is eliminated. A meta channel used online in this cycle is a meta channel whose memory has been eliminated. That is, the meta channel used online in this cycle is the meta channel whose memory has been eliminated in the previous cycle, and the meta channel whose memory is eliminated offline in this cycle is used online in a next cycle.

In a case that the number of the meta channels is insufficient, if the memory of a meta channel has not been eliminated in this cycle when data reaches the channel, it is required to eliminate the memory of the meta channel first and then process the data by the meta channel.

It can be seen that the dynamic heterogeneous redundancy memory elimination apparatus shown in FIG. 1 is capable of eliminating memory of the meta channels. The generalized disturbance, serving as an external cause, is capable of activating a failure (serving as an internal cause) of the second strategy, thereby producing an error and invalidation.

Therefore, the error and invalidation caused by the activated failure are corrected according to the first strategy. In addition, the first strategy is adjusted according to a feedback control strategy triggered by a decoding result of processed data, thus to form a closed loop of steps, and an endogenous security problem is solved without external software and hardware. In summary, with the technical solutions according to the present disclosure, the endogenous security problem is solved through an endogenous security mechanism.

Beneficial effects of the dynamic heterogeneous redundancy memory elimination apparatus shown in FIG. 1 are described in detail below.

In the system shown in FIG. 1, meta channels are independent from each other, and thus the multiple meta channels form a heterogeneous redundancy structure. The decoding result of the output data of the meta channels is fed back to the channel memory elimination module, and thus the dynamic heterogeneous redundancy memory elimination apparatus shown in FIG. 1 is a dynamic heterogeneous redundancy (DHR) memory elimination architecture.

The core idea of the DHR is described as following. According to the common sense "construction determines security" and under the condition that a function of an intrinsic service set is kept unchanged, it is introduced a policy scheduling (corresponding to the feedback control module) based on multi-mode error correction decoding and a multi-dimensional dynamic reconfiguration robust control mechanism (corresponding to the channel memory elimination module), endowed the running environment with dynamic reconfigurable, software definable and algorithm reconfigurable functional attributes, and formed an uncertainty effect from the perspective of the attacker, so that the target running scene has dynamic, random and diverse iterable convergence in restraining the generalized uncertain disturbance. In addition, collaborative approaches between executive bodies are strictly isolated or synchronization and sharing mechanisms available to an attacker are eliminated as much as possible, so as to maximize avoidance or disintegration of the uncertain threat of an intentional use of the endogenous security problem based on the dynamic heterogeneous redundancy environment, the non-cooperative mode and the multi-mode error correction decoding, thereby significantly improving the tolerance of software and hardware differential mode failure or random invalidation. In other words, it is expected to obtain the multi-in-one endogenous security function through the DHR, which is able to effectively suppress the non-cooperative or differential mode attack disturbance based on the endogenous security problem of the target object, and also to ensure that a model perturbation range is controlled to be within a given threshold even if a cooperative attack escapes. Uncertainty of an attack chain is significantly increased, and generalized robust control service or application performance with an integration mechanism including high reliability, highly availability and highly credibility are fully enhanced. It is expected to significantly weaken harsh heterogeneous design requirements, so that DHR construction becomes a new enabling technology with wide application prospects.

Therefore, the DHR has all elements required by the endogenous security mechanism in terms of organizational structure, operation mode and institutional arrangement. The process of using the DHR in the target object is a process of establishing the endogenous security mechanism for the target object, which is reflected in the following aspects:

(1) The DHR is a completely open organizational structure, allowing any endogenous security problem to be contained in software and hardware modules or components in the structure, that is, the DHR can reliably play a desired role in any "toxic and bacterial" scenario.

(2) The DHR is an integrated fusion structure and provides a use function with high reliability, high credibility and high availability. DHR can not only solve the traditional functional security problem, but also control the non-traditional security problem.

(3) The DHR is capable of coordinately using defense elements of diversity, randomness and dynamism, to form an endogenous uncertainty effect and an undetectable "defense fog".

(4) The DHR is composed of five parts including a heterogeneous part, a redundant part, a dynamic part, an error correction decoding part and a feedback control part, which maximizes the coordination effect of the three defense elements "dynamism, diversity and randomness".

(5) With the DHR, the use of the conventional security protection technology or other technology is naturally accepted, and an exponential defense gain can be obtained.

(6) The DHR has universal application significance for all software and hardware systems.

In addition, the coordination relationship formed based on the DHR, functions and related strategies creates an endogenous security mechanism with unique advantages, which is embodied in the following aspects.

In a first aspect, the uncertainty defense fog formed by the DHR security mechanism is for controlling or suppressing the generalized uncertain disturbance based on the endogenous security problem of the target object, which belongs to a typical man-machine game relationship. If background processing functions such as artificial intelligence and big data are introduced, an advantage can fully be showed in man-machine, machine-machine and machine-man games.

In a second aspect, the DHR security mechanism may conditionally control or suppress the generalized uncertain disturbance for the target object, but cannot completely eliminate a common mode escape, although the escape is a minimum probability event.

In a third aspect, effectiveness of the DHR security mechanism does not depend on any prior knowledge or other additional, built-in and symbiotic security measures or technical means, and the DHR security mechanism may fuse relevant technical achievements to improve the security gain in an exponential level.

In a fourth aspect, the DHR security mechanism is capable of providing an integrated performance of high reliability, high credibility and high availability for the target object in a fusion manner by using the same technical architecture.

In a fifth aspect, the security effect formed by the DHR security mechanism may be verified through the "white box injection" test method in reliability verification theory, and has stability robustness and quality robustness of quantifiable design and verifiable measurement.

In a sixth aspect, the use efficiency of the DHR security mechanism is weakly or not related to technical ability and past experience of an operation and maintenance manager, and has an incomparable advantage of an efficiency-cost ratio in the whole life cycle.

The channel memory elimination module can effectively block a time coordination attack and make an attack effect unsustainable and irreproducible.

In summary, the network security defense system (i.e., the dynamic heterogeneous redundancy memory elimination architecture) shown in FIG. 1 has an endogenous security mechanism, thus to realize endogenous security defense.

Figure 2:
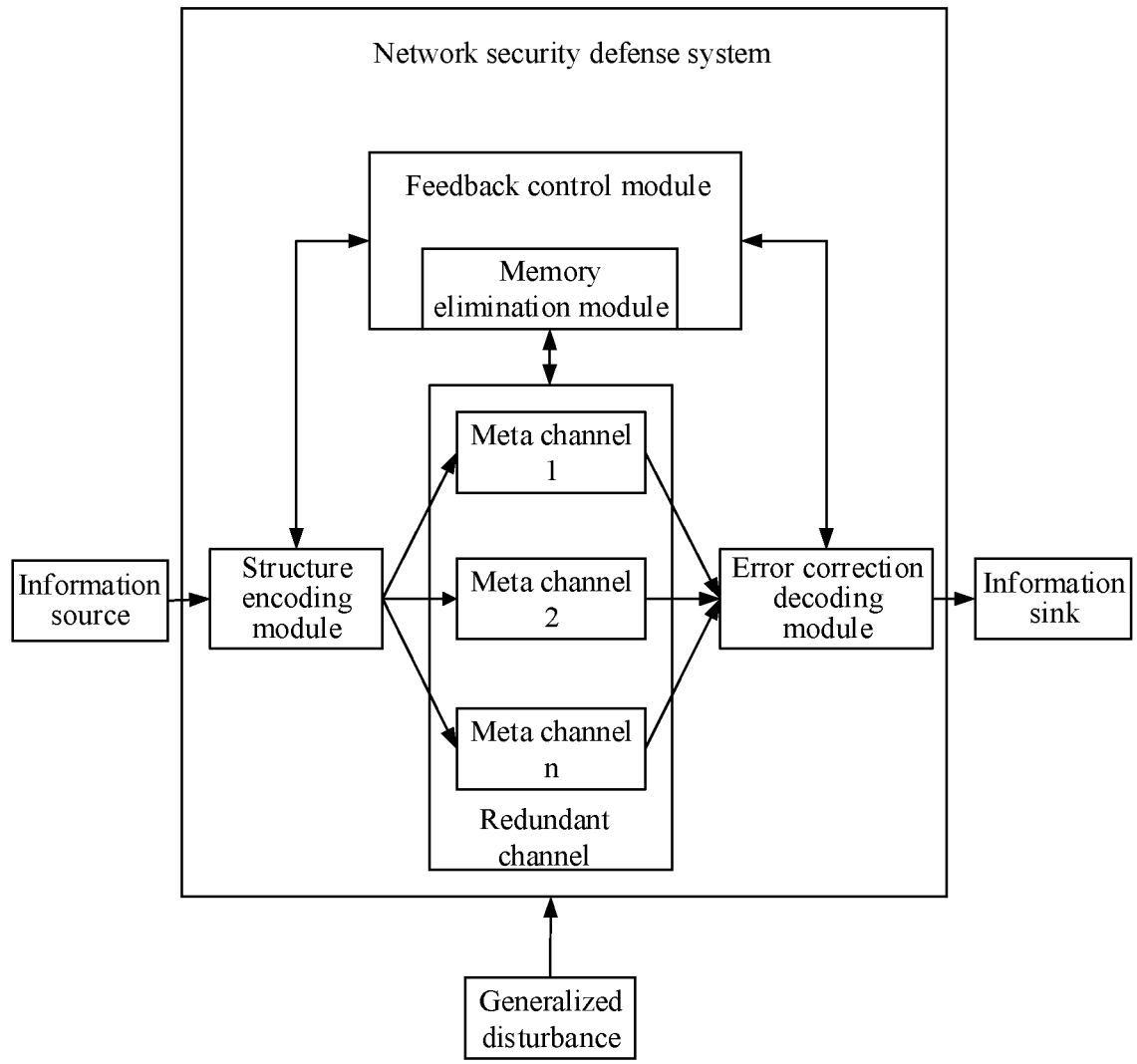
FIG. 2 is a schematic structural diagram of a network security defense system according to an embodiment of the present disclosure.

Based on the system shown in FIG. 1, a network security defense system is further provided according to an embodiment of the present disclosure. As shown in FIG. 2, the system includes a structure encoding module, a redundant channel, an error correction decoding module, a feedback control module, and a memory elimination module.

The structure encoding module is configured to encode structures of meta channels according to a structure encoding strategy, to construct multiple meta channels with the above functions. For a specific structure encoding strategy, reference may be made to the conventional technology. The structure encoding strategy may include an encoding manner and a strategy for controlling on-line and/or off-line of a meta channel constructed by encoding.

For the structure of the redundant channel and the function of any one of the meta channels in the redundant channel, reference may be made to the above embodiments.

The memory elimination module is configured to eliminate an influence of a generalized disturbance on a second strategy according to a memory elimination strategy. The second strategy is used for meta channels to realize functions, and for the specific implementation, reference may be made to the above embodiments.

The error correction decoding module is configured to perform error correction decoding on results outputted by multiple meta channels according to an error correction decoding strategy, to obtain an output result of the system. For the specific error correction decoding strategy, reference may be made to the conventional technology.

The feedback control module is configured to trigger a feedback control strategy based on the output result of the system, and transmit the feedback control strategy to the memory elimination module.

The memory elimination module is further configured to adjust the first strategy based on the feedback control strategy.

In an embodiment, the memory elimination module is further configured to: eliminate an influence of generalized disturbance on the structure encoding module, and/or eliminate an influence of generalized disturbance on the error correction decoding module. That is, compared with the above embodiment, the structure encoding module and the error correction decoding module are included in this embodiment, and thus the memory elimination module may further eliminate memory of at least one of the structure encoding module and the error correction decoding module on the influence caused by the generalized disturbance.

In an embodiment, the feedback control module is further configured to: provide the structure encoding strategy for the structure encoding module, and/or provide the error correction decoding strategy for the error correction decoding module. The providing the strategy includes: providing an initial strategy and updating the initial strategy. Further, the feedback control module may determine the adjusted strategy as a part of content of the feedback control strategy and distribute the adjusted strategy to a corresponding module. Manners in which the feedback control module generates and adjusts the feedback control strategy may be preconfigured according to requirements. For the manners, reference may be made to the conventional technology, which will not be repeated herein.

In an embodiment, the feedback control module may further acquire the memory elimination strategy by interacting with the memory elimination module, and adjust various strategies outputted by the feedback control module itself accordingly. Further, the feedback control module may further adjust various strategies outputted by the feedback control module based on data fed back by the structure encoding module and the error correction decoding module.

Similarly, the structure encoding module, the redundant channel, the error correction decoding module, the feedback control module and the memory elimination module form a closed loop. For a specific implementation, reference may be made to the above embodiments, which will not be repeated herein. Different from the above embodiment, the structure encoding module adjusts a structure and an encoding strategy used in this cycle by using the feedback control strategy adjusted in the previous cycle. For implementations of channel structure and an adjustment of a structure strategy, reference may be made to the conventional technology.

It can be seen that the network security defense system shown in FIG. 2 has an endogenous security mechanism and is capable of defending against the endogenous security problem.

It should be noted that the memory elimination manner in the above embodiments includes but is not limited to eliminating memories by reconstructing, reorganizing, redefining, dynamic scheduling and cleaning the meta channels and other modules (e.g., the structure encoding module and the error correction decoding module). Furthermore, the reconstructing, reorganizing, redefining, dynamic scheduling and cleaning manner are based on a feedback control strategy. The functions of reconfiguring, reorganizing, redefining, dynamic scheduling and cleaning may be abstracted into functional modules or subsystems. For structures of the functional modules or the subsystems, reference may be made to the component pool in a scheduling module in mimicry defense architecture in the conventional technology, which will not be repeated herein.

Figure 3:
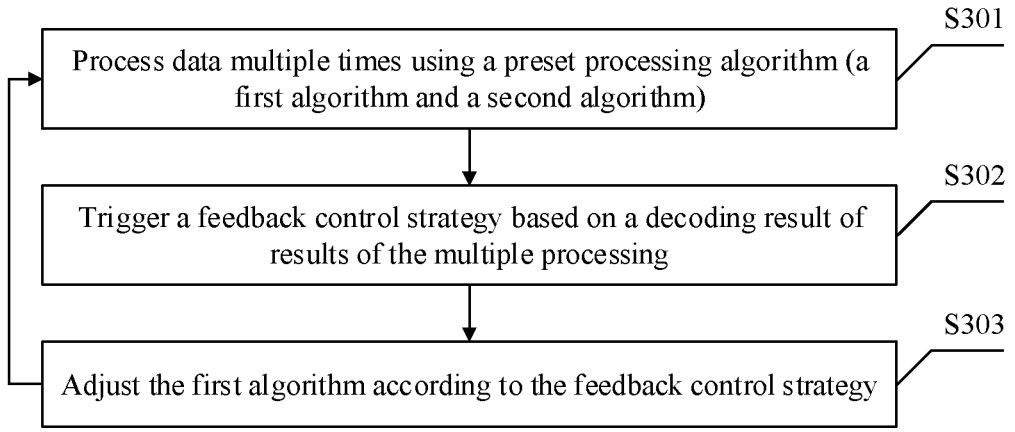
FIG. 3 is a flowchart of a network security defense method according to an embodiment of the present disclosure.

It should be emphasized that although the functions of the functional modules shown in FIG. 2 or FIG. 3 are implemented according to the conventional technology, combining the functional modules to form a network security defense system is an innovative achievement proposed by the applicant and the reason is the construction principle described above. In other words, in the conventional technology, there are many kinds of functional modules applied to network communication, and the applicant, based on the definition, the connotation, the characteristics and the solution ideas of the endogenous security problem obtained in research, creatively combines the above modules to form a security defense system with the endogenous security mechanism, so as to solve the endogenous security problem in cyberspace.

Furthermore, in order to further increase the security defense effect, the feedback control module and the memory elimination module are implemented by the dynamic heterogeneous redundancy mechanism. In an embodiment, the feedback control module and the memory elimination module may be set separately as shown in FIG. 1 or may be integrated as shown in FIG. 2.

The functions of the functional modules shown in FIG. 1 and FIG. 2 may be summarized as a network security defense method shown in FIG. 3. The method includes the following steps S301 to S303.

In step S301, data is processed multiple times using a preset processing strategy.

The processing strategy includes a first strategy and a second strategy. The first strategy is used for eliminating an influence of generalized disturbance on the second strategy. The second strategy after being eliminated the influence is applied to data, to process the data. The first strategy includes an encoding strategy, a decoding strategy and a memory elimination strategy. That is, the structure encoding strategy used by the structure encoding module, the error correction decoding strategy used by the error correction decoding module and the memory elimination strategy used by the memory elimination module in the above embodiment may be included in the first strategy.

It should be noted that the first strategy may be obtained in advance. As described above, the first strategy is adjusted by a historical feedback control strategy (for example, a feedback control strategy in a previous cycle). The historical feedback control strategy is triggered by a decoding result of results of multiple history processing (for example, multiple processing in the previous cycle) of the meta channel.

In this embodiment, the generalized disturbance includes random disturbance and/or non-random disturbance.

It can be understood that for each of the multiple processing, the influence of the generalized disturbance on the second strategy is eliminated using the first strategy, and the second strategy after being eliminated the influence is applied to the data, to process the data. It can be seen that multiple processing are independent from each other.

In step S302, a feedback control strategy is triggered based on a decoding result of results of the multiple processing.

One processing result is obtained in any one of the multiple processing. Therefore, an error correction decoding may be performed on data of the multiple processing results to obtain a decoding result. For the implementation of the error correction decoding, reference may be made to the conventional technology.

In step S303, the first strategy is adjusted according to the feedback control strategy.

It can be understood that the adjusted first strategy may be used for eliminating the influence of the generalized disturbance on the second strategy subsequently (for example, in a next period).

In an embodiment, the encoding strategy and/or the error correction decoding strategy may further be adjusted according to the feedback control strategy.

In FIG. 3, an arrow pointing from S301 to S303 indicates the closed loop of the above steps.

With the method shown in FIG. 3, the endogenous security problem can be solved through the endogenous security mechanism.

The performance of the network security defense system shown in FIG. 2 is evaluated below. The meta channels shown in FIG. 2 are in an environment of generalized disturbance, and thus in the conventional technology, the security defense mechanism in this environment can only be qualitatively evaluated.

A probability-based effect evaluation method (quantitative evaluation) is creatively provided according to an embodiment of the present disclosure. The method includes the following steps.

In a case that the meta channel is in an environment of non-random disturbance or in an environment of random disturbance, it may be used the output probability of the channel to evaluate the performance, that is, to evaluate an output error probability of the meta channel.

In a case that the meta channel is in the environment of non-random disturbance, the basis for evaluation using the output probability of the channel is described as following.

A non-random noise (an artificial disturbance), when being in a memory channel, will result that the invalidation of the network security defense system shown in FIG. 2 is random. That is, an effect of the non-random noise on the network security defense system shown in FIG. 2 is the same as that of a random noise.

The reason for the above is demonstrated below.

Figure 4:
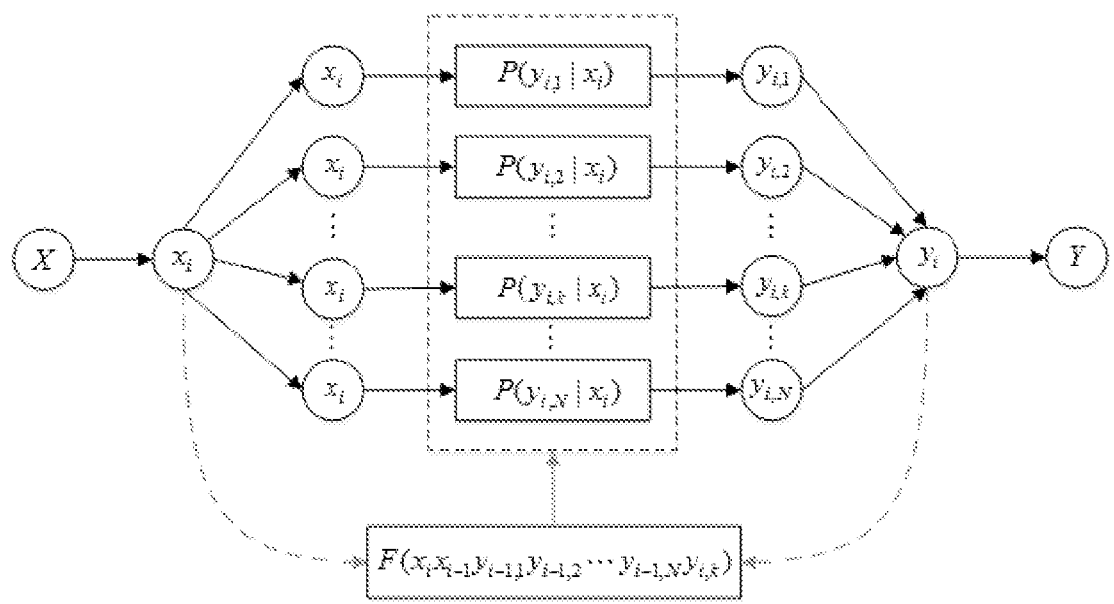
FIG. 4 is a flowchart of an effect evaluation method for the network security defense system according to an embodiment of the present disclosure.

A mathematical model of the network security defense system shown in FIG. 2 is shown in FIG. 4. A sample space of an input X is represented as x={0,1}, and a sample space of an output response Y is represented as y={0,1}.

Assuming that an attack arrives at a speed $\lambda$ greater than 0, and k represents a combination of meta channels in a case that a collaboration trigger loophole backdoor mechanism deployment is required for the heterogeneous meta channels. Assuming that there are three mathematical expressions representing a relation between the probability of successful attack on a single executive body and time t:

$$P_s(t) = \begin{cases} p = 1 - \dfrac{1-e^{(t-T_s)}}{1-e^{-T_s}}, t \le T_s \\ 1, t \le T_s \end{cases} \quad (10)$$

$$P_s(t) = \begin{cases} p = 1 - \dfrac{1-e^{(-t+T_s)}}{1-e^{T_s}}, t \le T_s \\ 1, t > T_s \end{cases} \quad (11)$$

$$P_s(t) = \begin{cases} p = \dfrac{t}{T_s}, t \le T_s \\ 1, t > T_s \end{cases} \quad (12)$$

It is advisable to deploy differential-mode channels with probability $$p = \dfrac{k}{C_M^N}$$

for the first time.

(1) For the first time to select a combination of differential-mode meta channels, the proof includes two processes.
1) Process 1: The Network Security Defense System Solution is not Deployed For a group of N-redundant heterogeneous meta channels in k, the attacker needs to deploy a loophole backdoor collaboration trigger mechanism to realize a decoding error. Therefore, for the combination of the heterogeneous meta channels, the attacker cannot perform collaborative attacks at one time. Due to heterogeneity between the meta channels, the attacker needs to spend different time $T_i$ ($T_i>0$) for each heterogeneous meta channel i to deploy the mechanism for triggering loophole backdoor collaboration.

For each meta channel:

$\forall t < T_i, i \in [1,N]$, probability of invalidation of a single meta channel is expressed as:

$$P_s'(t)=p(t)<P_s'(T_i)=1 \quad (13)$$

where p(t) represents a probability function of the attacker attacking a single meta channel in a form of the above assumed combined attack.

The N meta channels are decoded, and then:

$$\exists T_e, T_e \in \{T_1, T_2, \ldots, T_N\} \quad (14)$$

$$P_e'(t) = \begin{cases} p_e(t) < 1, t < T_e \\ 1, t \ge T_e \end{cases}$$

$$\exists T_e, t \ge T_e, P_e'(t) = 1 \quad (15)$$

where $p_e(t)$ represents a probability function of the attacker attacking the N heterogeneous meta channels in a form of the above assumed combined attack.

As a result, it can be concluded that:

$$\forall t, t \in (0, T_e), P(y=\bar{x}'|x')=p_e(t) \quad (16)$$

Therefore, before a time instant $T_e$, $p_e(t)<1$, and as long as the attack is unsuccessful, the attack always causes random invalidation to the system with probability $p_e(t)<1$. If the attack arrives at a time instant t ($t=t_e<T_e$), then enter the process 2 in advance. At this time, $p_e(t_e)=1$. It is advisable to assume that $t_e$ is equal to $T_e$ and the proof is described as following.

2) Process 2: A Dynamic Feedback Memory Elimination Control Process

It can be seen from the process 1 that if no feedback control strategy is introduced, the system is a static deterministic system relative to the attacker at a time instant t ($t \ge T_e$).

$$\forall t, t \in [T_e, \infty), P(y=\bar{x}'|x')=1 \quad (17)$$

The time instant t ($t \ge T_e$) is equivalent to the first deployment of the common mode channel.

After the dynamic feedback control strategy is introduced, a random factor $\mu(t)$ is introduced to the system.

In a case that the feedback control exists, for one reconstructed group of N-redundant heterogeneous meta channels which is selected from k groups of heterogeneous executive bodies according to a certain probability, due to the heterogeneity, the attacker still needs to spend time $T_i$ greater than zero to deploy the mechanism for triggering the loophole backdoor for each meta channel, to realize a decoding error.

For the feedback control mechanism, the defender realizes reconstruction recovery at a feedback controllable speed $\mu'(t)$.

The probability of triggering the feedback control strategy at a time instant t is expressed as:

$$P_r(t)=P_r(\mu'(t)) \quad (18)$$

It is advisable to assume that time for the defender to realize reconstruction recovery is subject to a negative exponential distribution with a speed $\mu'$ greater than zero.

$$\forall t, t \in (0, \infty), P_r(t)=1-e^{-\mu't}>0 \quad (19)$$

Probability of invalidation of the meta channel at a time instant t is expressed as:

$$\forall t, t \in (0, \infty), P_{si}(t)<1-(1-e^{-\mu't})=e^{-\mu't}<1 \quad (20)$$

In addition:

$$\forall t', t' \in [T_e, \infty),$$

$$P(y = \overline{x'} | x') = 1 - \frac{k}{C_M^N} \cdot P_r(t') \quad (21)$$

In a case of N→∞, if $k = \delta C_M^N$, where $\delta$ is a constant greater than 0, then $$P(y = \overline{x'} | x') = 1 - \frac{k}{C_M^N} \cdot P_r(t') < 1 \quad (22)$$

In a case of k=1, the reconstruction recovery of the system degenerates to cleaning recovery.

Thus, $$\forall t \in [T_e, \infty), P_e'(t) < 1 \quad (23)$$

Therefore, $$\forall t \in [0, \infty), P_e'(t) < 1 \quad (24)$$

Therefore, with the dynamic heterogeneous redundancy and channel memory elimination solution, the network security defense system and the memory of the meta channels are uncertain, ensuring randomness of invalidation of the system.

In a case that the meta channel is in an environment of non-random disturbance, an implementation for evaluation using an output probability of the channel is described as following.

A noise (disturbance) arrives not randomly, and a discrete memory coding channel [P(y|xsf)] constructed by dynamic heterogeneous redundancy and feedback memory elimination has a channel capacity C, where $\forall t > 0$, $C(t) \in [C_s, C_0]$. If an encoding information transmission rate R(t) at a time instant t is less than C(t), as long as a code length and the number n of coding meta channels are large enough, $M = 2^{nR}$ code words can always be found in an input set, to form a code set, such that the output error probability $P_e(t)$ of the channel is less than or equal to $\varepsilon$ under a particular decoding rule, where $\varepsilon$ is an arbitrarily small positive number.

The proof is described below.

For a discrete memory channel $P(y_{i+1}(t)x_{i+1}(t)s, (t))$ with an attack disturbance, if $s_i(t)=0$, then it represents an influence of a normal output of a previous sequence i on an output of a sequence (i+1) at a time instant t, and the influence of the attack accumulates over time. If $s_i(t)=1$, then it indicates that the previous sequence i has an abnormal output, and the sequence i+1 at the time instant t will always be kept in the abnormal state with the probability of 1. It may be assumed that in the time instant t before the attack arrives, memorability that the attack successfully interferes with the meta channel is represented as a negative exponential distribution in time, which is described below.

1) Assuming that an attack arrives at a speed of $\lambda$, then $$P_s(t) = 1 - e^{-\lambda t} = p(t) \quad (25)$$

In a case that a feedback control memory elimination action f(t) is introduced and it is assumed that reconstruction recovery (or memory elimination) of the defender arrives at a controllable speed $\mu$, then $P_r(t) = 1 - e^{-\mu t} = p(f(t))$.

Figure 5:
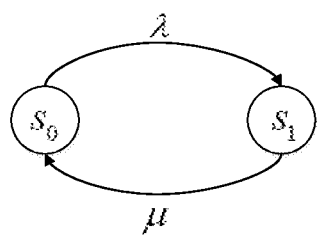
FIG. 5 is a schematic diagram of transitions of memory states of a meta channel.

Reference is made to FIG. 5, which is a schematic diagram of transitions of memory states of a meta channel. For a single discrete memory channel, a decoding error probability is expressed as:

$$P(y_i(t) \neq x_i(t) | x_i(t)) = -\frac{\lambda}{\lambda + \mu} e^{-(\lambda+\mu)t} + \frac{\lambda}{\lambda + \mu} < 1 \quad (26)$$

2) If an attack arrives at a time instant $T_s$, the system is kept in the attack state with probability of 1. In this case, the error probability of the discrete meta channel in triggering collaboration is $P_{si}(t) \leq e^{-\mu' t} < 1$ given in the lemma part of section 15.3.2, and the memory is uncertain. In a discrete disturbed memory channel, the dynamic heterogeneous redundancy architecture and the feedback control memory elimination action f(t) are introduced:

$$\forall t, P(y_{i+1}(t)|x_{i+1}(t)s_i(t)f_{i+1}(t)) = p_{i+1}(t) < 1 \quad (27)$$

If f(t)=0, it indicates that the feedback memory elimination event does not arrive at a time instant t. If f(t)=1, it indicates that the feedback memory elimination event arrives at the time instant t. Due to the non-random disturbance, attack preparation is cumulative before the attack arrives, so that a channel capacity C is within a certain range. After the feedback controllable memory elimination action f(t) is introduced, the channel capacity C is within a controllable range $\lceil C_s, C_0 \rceil$. If attack arrival time and feedback recovery time are subject to a negative exponential distribution, the whole coding channel has a steady-state distribution. In this case, $C_s$ represents a channel capacity in the steady state of the channel and $C_0$ represents a channel capacity in the initial state of the channel.

Assuming that an input sequence of the coding channel at a time instant t is x(t), where $x(t) \in X^n$, and $x(t) = (x_1(t), x_2(t), \ldots, x_n(t))$, and a decoding output is y(x(t)), where $y(x(t)) \in Y^n$ and $y(x(t)) = (y_1(x_1(t)), y_2(x_2(t)), \ldots, y_n(x_n(t)))$. M (where $M = 2^{nR}$) sequences are randomly selected from $X^n$ inputs as code words. It is assumed that all elements in X appear independently and equiprobably, that is, random encoding. For a given reception sequence y(x(t)) corresponding to a time instant t, if there is a unique k (where $k \in [1, 2^{nR(t)}]$), to cause $$(x_k(t), y(x(t))) \in T_{XY}(n, \varepsilon) \quad (28),$$

then, y(x(t)) is decoded as $x_k(t)$, that is, $F(y(x(t))) = x_k(t)$. $T_{XY}(n, \varepsilon)$ indicates that the sequence pair (x(t), y(x(t))) is a joint $\varepsilon$ typical sequence.

If a transmitted message is $x_m(t)$ and a reception sequence is $y(x_m(t))$, then the decoding error probability is expressed as:

$$P_{em} = P(x_k(t) \neq x_m(t) | y(x_m(t))) \quad (29)$$

Assuming that a first transmitted message is $x_l(t)$ and an event meets:

$$E_m = \{(x_m(t), y(x_m(t))) \in T_{XY}(n, \varepsilon)\}, m \in [1, 2^{nR}] \quad (30),$$

then the decoding error probability includes the following two parts.

(1) The transmitted code word $x_l(t)$ and the reception code word $y(x_l(t))$ do not constitute a joint $\varepsilon$ typical sequence and the event is $E_l^C(t)$.

(2) The code word $x_k(t)$ (where $k \neq 1$) and the reception code word $y(x_1(t))$ constitute a joint $\varepsilon$ typical sequence.

A decoding error probability of the first part is expressed as:

$$P(E_1^C(t))=1-P(E_1(t))\leq \varepsilon \tag{31}$$

A decoding error probability of the second part is expressed as:

$$P_{e1}(t) = P(x_k(t) \neq x_1(t) \mid x_1(t)) = \sum_{k \neq 1} P(E_k(t) \mid x_1(t)) \tag{32}$$

$$P(E_k(t) \mid x_1(t)) = \tag{33}$$

$$\sum_{j=1}^{Y^n} P(y_j(x_1(t)) \mid x_1(t)) P(F(y(x_1(t))) = x_k(t) \neq x_1(t) \mid y_j(x_1(t)))$$

$$= \sum_{j=1}^{Y^n} P(y_j(x_1(t)) \mid x_1(t)) P((x_k(t), y(x_1(t))) \in T_{XY}(n,\varepsilon)) k \neq 1 \tag{34}$$

$$P(E_k(t) \mid x_1(t)) = P((x_k(t), y(x_1(t))) \in T_{XY}(n,\varepsilon)), k \neq 1 \tag{35}$$

In a case that $x_k(t)$, $y(x_l(t))$ and $(x_k(t), y(x_l(t)))$ are all $\varepsilon$ typical sequences, there are $$P(x_k(t)) \leq 2^{-n[H(X)-\varepsilon]} \tag{36}$$

$$P(y(x_l(t))) \leq 2^{-n[H(Y)-\varepsilon]} \tag{37}$$

$$\|T_{XY}(n,\varepsilon)\| \leq 2^{n[H(XY)+\varepsilon]} \tag{38}$$

Since $y(x_l(t))$ is generated by $x_l(t)$ and is independent from other $x_k(t)$ (where $k \neq 1$), $$P(E_k(t) \mid x_1(t)) = \sum_{\substack{x_k(t) y(x_1(t)) \\ (x_k(t), y(x_1(t))) \in T_{XY}(n,\varepsilon)}} P(x_k(t)) P(y(x_1(t))), k \neq 1. \tag{39}$$

Thus, $$P(E_k(t)) \leq 2^{-n[I(XY)-3\varepsilon]} \tag{40}$$

$$\sum_{k \neq 1} P(E_k(t)) \leq (2^{nR(t)} - 1) \cdot 2^{-n[I(XY)-3\varepsilon]} \tag{41}$$

$$\sum_{k \neq 1} P(E_k(t)) \leq 2^{n[R(t)-C(t)+3\varepsilon]}. \tag{42}$$

Therefore, at the time instant t, there are:

$$P_e(t) = P(E_1^C(t)) + P_{e1}(t) \tag{43}$$

$$P_e(t) \leq \varepsilon + 2^{n[R(t)-C(t)+3\varepsilon]} \tag{44}$$

$\forall \eta = 3\varepsilon > 0$, $R(t) < C(t) - \eta$, $n \to \infty$, then $$\sum_{k \neq 1} P(E_k(t)) \to 0 \tag{45}$$

$$P_e(t) \leq \varepsilon \tag{46}$$

That is, $P_e(t)$ is arbitrarily small.

It can be seen from the above proof that the structures shown in FIG. 1 and FIG. 2 have a good defense effect against the endogenous problem.

In addition, the applicant obtains the following conclusions with respect to the structures shown in FIG. 1 and FIG. 2.

Firstly, in the structures shown in FIG. 1 and FIG. 2, in a case of the noise (disturbance) arriving randomly, the discrete memoryless channel [P(y|x)] having a channel capacity C, the encoded information transmission rate R being less than C and the number n of memoryless meta channels being large enough in the coding channel, M (where $M=2^{nR}$ code words can always be found in an input set, to form a code set with a code length of n. Under a particular decoding rule, the output error probability $P_e$ of the channel can be less than or equal to $\varepsilon$, where $\varepsilon$ is an arbitrarily small positive number.

In the random noise memoryless channel, the noise of the coding channel is random and the constructed meta channels are all memoryless channels. Shannon's second theorem requires that the channel be memorylessly extended n times, the noise of each extended channel is random, and all extended channels are memoryless channels. Therefore, under the random noise memoryless channel, the structure of the shown in FIG. 2 has the same conditions to meet the first theorem and the Shannon's second theorem.

Secondly, for the condition of the random noise memory channel, the randomness of the invalidation of the structure shown in FIG. 2 is analyzed as following.

The noise of the meta channel arrives randomly, thus
  at any time instant t, the probability $P_e$ of the noise successfully causing an output error of the channel is greater than 0 and less than 1 (i.e., $0 < P_e < 1$);
  at a time instant t equal to Ts, the random noise successfully causes an output error of the channel, and the channel has memory, thus
  at any time instant t greater than Ts, the output error probability $P_e$ of the channel is equal to 1 (i.e., $P_e = 1$).

It can be proved that the solution of the dynamic heterogeneous redundancy and the feedback memory elimination channel construction can ensure the randomness of invalidation of the system.

Thirdly, for condition of the non-random noise (artificial disturbance) memory channel, the randomness of the invalidation of the structure shown in FIG. 2 is analyzed as following.

The disturbance of the meta channel arrives not randomly, and the generalized disturbance interferes with the meta channel with a certain rule (for example, the disturbance arrives with a negative exponential distribution, to continuously improve a success rate of the interference). In addition, the meta channel has memory, and thus the following analysis is obtained:

At a time instant t equal to Ts, the disturbance arrives. At any time instant t greater than Ts, the output error probability of the channel. Firstly, the randomness of the invalidation of the system introduced by the solution of the dynamic heterogeneous redundancy and the feedback memory elimination coding channel construction is proved.

From the perspective of the attacker (the non-random disturbance), there are two cases: one case that a common mode rate ω of the dynamic heterogeneous redundancy DHR architecture is equal to 1 (ω=1), and the other case that ω is less than 1 (ω<1).

(1) The total number of heterogeneous executive body combinations is M (N represents the set of heterogeneous executive bodies currently providing services), and the attacker has known cooperative loophole backdoor of all combinations, ω=1 (that is, M combinations can all be cooperated in one attack).

At any time instant t (t∈(0,∞)), the output error probability of the channel.

(2) The total number of heterogeneous meta channel combinations is equal to M, and there are k groups of N-redundant heterogeneous meta channels requiring for deploying a cooperative trigger loophole backdoor mechanism by the attacker, resulting in a decoding error. It can be proved that the common mode rate is expressed as:

$$\omega = 1 - \frac{k}{C_M^N} < 1, k = 1, 2, \ldots, C_M^N \quad (47)$$

A sample space for the input X is x={0,1}, and a sample space of the output response Y is y={0,1}.

A network security defense device is further provided according to an embodiment of the present disclosure. The device includes a processor and a memory. The memory is configured to store a program. The processor is configured to run the program, to implement the network security defense method or the method for evaluating the effect of network security defense.

A computer readable storage medium is further provided according to an embodiment of the present disclosure. The computer readable storage medium stores a computer program that, when being executed on a computer, implements the network security defense method or the method for evaluating the effect of network security defense.

The embodiments in this specification are described in a progressive way, each of which emphasizes the differences from others, and for the same or similar parts among the embodiments, reference may be made to each other.

With the description of the embodiments disclosed above, those skilled in the art may implement or use the present disclosure. Various modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. A network security defense system, comprising:
a redundant channel, and a network security defense device including a processor and memory, wherein:
the redundant channel comprises a plurality of meta channels, the plurality of meta channels have a same function and are independent from each other, each of the plurality of meta channels is in an environment of generalized disturbance, and the generalized disturbance comprises at least one of random disturbance and non-random disturbance, wherein the generalized disturbance interferes with data in the meta channels, resulting in a data error; the function comprises at least one of calculation, storage and communication of data;
the network security defense device is configured to perform at least one of reconstructing, reorganizing, redefining, dynamic scheduling, and data cleaning on the meta channels in accordance with a first strategy;
any one of the meta channels is configured to implement the calculation, storage and communication of the data;
the network security defense device is further configured to:
adjust the first strategy according to the feedback control strategy based on a decoding result of performing decoding on outputs of the plurality of meta channels.

2. The system according to claim 1, wherein the network security defense device is further configured to:
encode structures of the meta channels according to a structure encoding strategy, to construct the plurality of meta channels having the function; and
perform error correction decoding on results outputted by the plurality of meta channels according to an error correction decoding strategy, to obtain an output result of the system.

3. A method for evaluating an effect of network security defense, wherein the method is applied to the a network security defense system, wherein the network security defense system comprises a redundant channel, and a network security defense device including a processor and memory, wherein:
the redundant channel comprises a plurality of meta channels, the plurality of meta channels have a same function and are independent from each other, each of the plurality of meta channels is in an environment of generalized disturbance, and the generalized disturbance comprises at least one of random disturbance and non-random disturbance, wherein the generalized disturbance interferes with data in the meta channels, resulting in a data error; the function comprises at least one of calculation, storage and communication of data;
the network security defense device is configured to perform at least one of reconstructing, reorganizing, redefining, dynamic scheduling and data cleaning on the meta channels in accordance with a first strategy;
any one of the meta channels is configured to implement the calculation, storage and communication of the data;
the network security defense device is further configured to adjust the first strategy based on a decoding result of performing decoding on outputs of the plurality of meta channels, and
the method comprises evaluating an output error probability of the meta channels, in a case that the meta channels are in an environment of the non-random disturbance.

4. The method according to claim 3, wherein the evaluating the output error probability of the meta channels comprises:
finding a set of $2^{nR}$ code words in a case that a quantity of the meta channels is greater than a preset first threshold and a code length of data transmitted by the meta channels is greater than a preset second threshold, wherein the output error probability of the meta channels is an arbitrarily small positive number under a preset decoding rule.

5. A network security defense method, wherein the method is applied to a network security defense system wherein the network security defense system comprises a redundant channel, and a network security defense device including a processor and memory, wherein:
the redundant channel comprises a plurality of meta channels, the plurality of meta channels have a same function and are independent from each other, each of the plurality of meta channels is in an environment of generalized disturbance, and the generalized disturbance comprises at least one of random disturbance and non-random disturbance, wherein the generalized disturbance interferes with data in the meta channels, resulting in a data error; the function comprises at least one of calculation, storage and communication of data;
any one of the meta channels is configured to implement the calculation, storage and communication of the data;
the network security defense device is configured to perform at least one of reconstructing, reorganizing, redefining, dynamic scheduling, and data cleaning on the meta channels in accordance with a first strategy;

and adjust the first strategy based on a decoding result of performing decoding on outputs of the plurality of meta channels, and the method comprises:

processing data in the plurality of meta channels a plurality of times to obtain a plurality of processing results; and adjusting the first strategy according to the decoding result of the plurality of processing results.

6. The network security defense method according to claim 5, wherein the method further comprises:

adjusting at least one of an encoding strategy and a decoding strategy applied in the network security defense system according to the decoding result of the plurality of processing results.

* * * * *